(12) United States Patent
Ajitomi et al.

(10) Patent No.: US 9,131,261 B2
(45) Date of Patent: Sep. 8, 2015

(54) APPARATUS AND METHOD FOR AUTOMATIC CONVERSION OF CONTENT ADDRESS AND ASSOCIATED ACTION THEREOF FOR SOCIAL TELEVISION SHARING

(75) Inventors: Daisuke Ajitomi, Tokyo (JP); Hiroyuki Aizu, Kanagawa-ken (JP); Keisuke Minami, Kanagawa-ken (JP); Kotaro Ise, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/617,841

(22) Filed: Sep. 14, 2012

(65) Prior Publication Data

US 2013/0276009 A1    Oct. 17, 2013

(30) Foreign Application Priority Data

Nov. 28, 2011 (JP) ................................. 2011-259632

(51) Int. Cl.
| | | |
|---|---|---|
| *H04H 60/32* | (2008.01) | |
| *H04N 21/43* | (2011.01) | |
| *H04N 21/658* | (2011.01) | |
| *H04N 21/858* | (2011.01) | |
| *H04N 21/4788* | (2011.01) | |

(52) U.S. Cl.
CPC ........... *H04N 21/43* (2013.01); *H04N 21/6581* (2013.01); *H04N 21/8586* (2013.01); *H04N 21/4788* (2013.01)

(58) Field of Classification Search
CPC ..................................................... H04N 21/60
USPC .................................................. 725/51, 109
See application file for complete search history.

(56) References Cited

U.S. PATENT DOCUMENTS

| | | | |
|---|---|---|---|
| 6,502,243 B1* | 12/2002 | Thomas ......................... | 725/110 |
| 2002/0010932 A1* | 1/2002 | Nguyen et al. ................... | 725/51 |
| 2002/0161863 A1* | 10/2002 | McGuire ....................... | 709/220 |

(Continued)

FOREIGN PATENT DOCUMENTS

| | | |
|---|---|---|
| CN | 101075455 | 11/2007 |
| CN | 102014298 | 4/2011 |
| WO | 03/047256 | 6/2003 |

OTHER PUBLICATIONS

Nevali/Baird, IP Remote Control, Aug. 14, 2010, On-line at https://github.com/nevali/Baird/wiki/IP-remote-control.*
M. Handley et al., SDP: Session Description Protocol, Jul. 2006, Network Working Group-Request for Comments 4566.*
TVDNS Specification v. 0.6.2. http://projectbaird.com/discovery/tvdns/ ;retrieved Jun. 22, 2012, 3 pages.

(Continued)

*Primary Examiner* — Hai V Tran
*Assistant Examiner* — Tien M Nguyen
(74) *Attorney, Agent, or Firm* — Nixon & Vanderhye, P.C.

(57) ABSTRACT

An information processor includes a receiver configured to receive, from a first device, a response information request including content identification information for identifying a content in a network; an extraction portion configured to extract a plurality of element information pieces included in the content identification information; a storage to store therein each of conditions for a first element information piece among the plurality of element information pieces, and a response information piece in association with each other; and a generator configured to generate a response message including the response information piece stored in association with a condition that the first element information piece extracted by the extraction portion satisfies among the conditions for the first element information piece stored in the storage portion.

17 Claims, 23 Drawing Sheets

(56) References Cited

U.S. PATENT DOCUMENTS

2006/0143653 A1* 6/2006 Suh .................................. 725/46
2008/0127255 A1* 5/2008 Ress et al. ....................... 725/38
2011/0061070 A1 3/2011 Oh et al.

OTHER PUBLICATIONS

Office Action mailed Apr. 3, 2015 in counterpart Chinese Patent Application No. 201210342268.4 and English language translation thereof.

* cited by examiner

| COLUMN NAME | ENTRY 1 | ENTRY 2 |
|---|---|---|
| CONDITIONS FOR ELEMENT INFORMATION | CONDITION 1 | CONDITION 2 |
| RESPONSE INFORMATION | RESPONSE INFORMATION 1 | RESPONSE INFORMATION 2 |

FIG. 2

|  | COLUMN NAME | ENTRY 1 | ENTRY 2 |
|---|---|---|---|
| CONDITION 1 | Is Started (WHETHER OR NOT IT IS BEFORE START OF PROGRAM) | no | yes |
| RESPONSE INFORMATION | Title (CONTROL ORDER CHARACTER STRING) | CHANGE CHANNEL | PROGRAM RECORDING |
|  | ProgramPath (CONTROL ORDER PROGRAM PATH) | http://tv.nameservice.com/apis/changeChannel.js | http://tv.nameservice.com/apis/reserveProgram.js |

FIG. 4

```
1   <!DOCTYPE html PUBLIC "-//W3C//DTD XHTML 1.0 Transitional//EN"
2   "http://www.w3.org/TR/xhtml1/DTD/xhtml1-transitional.dtd">
3   <html xmlns="http://www.w3.org/1999/xhtml">
4   <head>
5   <!-- DEFINITION OMITTED -->
6
7   <!-- CALL DEVICE CONTROL PROGRAM (LIBRARY) -->
8   <script src="$1">
9   </head>
10  <body>
11  <form name="sample">
12  <input type="button" value="$2" onClick="device.execute($3,$4,$5,$6)">
    </form>
    </body>
    </html>
```

FIG. 7

```
1  var device = {
2
3    execute: function (network_id, service_id, transport_stream_id, start_date) {
4
5      // CALL CHANNEL CHANGE FUNCTION INPENENDENT OF DEVICE TYPE
6      return setChannelNative(network_id, service_id, transport_stream_id);
7
8    }
9  };
```

FIG. 8

| COLUMN NAME | BROADCASTER 1 | BROADCASTER 2 | BROADCASTER 3 | BROADCASTER 4 |
|---|---|---|---|---|
| AreaId (BROADCAST AREA) | TOKYO | TOKYO | OSAKA | OSAKA |
| ServiceGroupId (BROADCASTER GROUP IDENTIFIER) | 1 | 2 | 1 | 2 |
| NetworkId (NETWORK ID) | 101 | 101 | 101 | 101 |
| ServiceId (SERVICE ID) | 201 | 202 | 203 | 204 |
| TransportStreamId (TRANSPORT STREAM ID) | 301 | 302 | 303 | 304 |

FIG. 11

| COLUMN NAME | PROGRAM INFORMATION 1 | |
|---|---|---|
| ServiceGroupId (BROADCASTER GROUP IDENTIFIER) | 1 | |
| NetworkId (NETWORK ID) | 101 | |
| ServiceId (SERVICE ID) | 201 | |
| TransportStreamId (TRANSPORT STREAM ID) | 301 | |
| TITLE OF PROGRAM NEWS | NEWS19:00 | |
| EXPLANATION OF PROGRAM DAILY NEWS | DAILY NEWS IS SENDED | |
| START TIME | 19:00 | |
| END TIME | 20:00 | |

FIG. 12

| | COLUMN NAME | ENTRY 1 | ENTRY 2 | ENTRY 3 |
|---|---|---|---|---|
| CONDITION 1 | DeviceType (DEVICE TYPE INFORMATION) | 42XX001 | 42XX001 | 37ZZ002 |
| CONDITION 2 | IsBroadcasting (WHETHER OR NOT IT IS ON AIR) | no | yes | no |
| RESPONSE INFORMATION | Title (CONTROL ORDER CHARACTER STRING) | PROGRAM RECORDING | CHANGE CHANNEL | PROGRAM RECORDING |
| | ProgramPath (CONTROL ORDER PROGRAM PATH) | http://tv.nameservise.com/apis/42XX001/reserveProgram.js | http://tv.nameservise.com/apis/42XX001/changeChannel.js | http://tv.nameservise.com/apis/37ZZ002reserveProgram.js |

FIG. 13

```
1  <!DOCTYPE html PUBLIC "-//W3C//DTD XHTML 1.0 Transitional//EN"
2  "http://www.w3.org/TR/xhtml1/DTD/xhtml1-transitional.dtd">
3  <html xmlns="http://www.w3.org/1999/xhtml">
4  <head>
5  <!-- DEFINITION OMITTED -->
6
7  <!-- CALL DEVICE CONTROL PROGRAM (LIBRARY) -->
8  <script src="$1">
9  </head>
10 <body>
11 <div id="broadcasterName">BROADCASTER:$2</div>
12 <div id="title">TITLE OF PROGRAM:$3</div>
   <div id="description">DESCRIPTION OF PROGRAM:$4</div>
   <form name="sample">
   <input type="button" value="$5" onClick="device.execute($6,$7,$8,$9)"/>
   </form>
   </body>
   </html>
```

FIG. 15

```
1
2  var device = {
3    execute: function (network_id, service_id, transport_stream_id, start_date) {
4
5      // CALL PROGRAM RECORDING FUNCTION FOR 42XX001
6      return reserve_42xx001(network_id, service_id, transport_stream_id, start_date);
7
8    }
9  };
```

FIG. 16

| | COLUMN NAME | ENTRY 1 | ENTRY 2 | ENTRY 3 | ENTRY 4 |
|---|---|---|---|---|---|
| CONDITION 1 | DeviceType (DEVICE TYPE INFORMATION) | - | - | - | 37ZZ002 |
| CONDITION 2 | ProtocolType (CONTROL PROTOCOL INFORMATION) | DLNA | DLNA | DLNA | local |
| CONDITION 3 | Tense(TENSE) | past | future | currenr | past |
| RESPONSE INFORMATION | Title (CONTROL ORDER CHARACTER STRING) | REPRODUCE RECORDED PROGRAM | PROGRAM RECORDING | CHANGE CHANNEL | PROGRAM RECORDING |
| | ProgramPath (CONTROL ORDER PROGRAM PATH) | http://tv.nameservice.com/apis/42XX001/playProgram.js | http://tv.nameservice.com/apis/42XX001/reserveProgram.js | http://tv.nameservice.com/apis/42XX001/changeChannel.js | http://tv.nameservice.com/apis/37ZZ002/reserveProgram.js |

| COLUMN NAME | CONTENT 1 | CONTENT 2 | CONTENT 3 |
|---|---|---|---|
| CONTENT CLASS IDENTIFIER | 100001 | 100002 | 100001 |
| | TERRESTRIAL DIGITAL BROADCAST | TERRESTRIAL DIGITAL BROADCAST | INTERNET VoD SERVICE (vod.example.com) |
| MEDIA-DEPENDENT CONTENT ID | {networkid:101, serviceid:201, transportStreamid:301, startDate:"2010-12-01T19:00:00"} | {networkid:101, serviceid:202, transportStreamid:301, startDate:"2010-12-01T19:00:00"} | http://vod.example.com/101/201/301/20101201190000 |
| MEDIA-DEPENDENT CONTENT URI | http://tv.nameservice.com/n_101/s_201/t_301/20101201190000 | http://tv.nameservice.com/n_101/s_202/t_301/20101201190000 | http://vod.example.com/101/201/301/20101201190000 |

APPARATUS AND METHOD FOR AUTOMATIC CONVERSION OF CONTENT ADDRESS AND ASSOCIATED ACTION THEREOF FOR SOCIAL TELEVISION SHARING

CROSS-REFERENCE TO RELATED APPLICATION

This application is based upon and claims the benefit of priority from Japanese Patent Application No. P2011-259632, filed on Nov. 28, 2011; the entire contents of which are incorporated herein by reference.

FIELD

Embodiments generally relate to an information processor, an information processing method and a computer readable medium.

BACKGROUND

In recent years, there is a trend to assign a universal resource identifier (URI), which is a globally unique identifier, to each program broadcasted on television, and to provide a service in which an Internet service and a television broadcast program are linked by use of the URI. As a method of assigning a URI to each program broadcasted on television, there is a method of automatically generating a URI from service information (SI) included in a broadcast wave of a television broadcast. Note that in this method, a URI is an identifier dependent on the broadcaster or the like. As a result, a single program may be assigned different URIs depending on areas.

A social network service (SNS) can be considered as an example of an Internet service being linked with a program broadcasted on television by use of the URI assigned to the television program. In SNS, a plurality of users share a URI assigned to a program broadcasted on television. For example, when user A informs user B of a program user A is currently viewing, and concurrently informs user B of the URI of the program, user B is able to view the same program by using (such as simply clicking) the URI.

Such a service in which a URI for identifying a television program and an Internet service are linked, particularly a service in which a plurality of users share a URI, faces some problems. To be specific, television B of user B may not be able to process a URI generated by television A of user A. For example, in a case where television B accesses a URI after the passage of a certain time from the time when television A generates the URI, the program may already be ended. In this case, user B cannot view the program identified by the URI by just clicking the URI. Moreover, when televisions A and B belong to different broadcast areas, such as television A being located in Tokyo and television B being located in Osaka, television B cannot identify the program from the URI generated by television A. This is because the URI of the television program is determined depending on the broadcaster or the like of the television program.

The above mentioned technology is disclosed in M. McRobert, "Automatic Service Discovery with TVDNS," [online], Jun. 12, 2010, Project Bird, [Searched on 14 Nov., 2011], the Internet <URL: http://projectbaird.com/discovery/tvdns/>, corresponding portion: TVDNS Specification, section (r02-2010-06-12), and contents of which are hereby incorporated by reference.

BRIEF DESCRIPTION OF THE DRAWINGS

FIG. 2 is a table showing an example of a data structure of a response information storage portion 1016 of FIG. 1;

FIG. 4 is a table showing an example of a data structure of a response information storage portion 1016 of an information processor 101 of the system in FIG. 3;

FIG. 7 is an example of a template of a web page returned by the information processor 101 of FIG. 3;

FIG. 8 is a diagram showing a pseudocode of a device control program;

FIG. 11 is a table showing an example of a data structure stored in a conversion information storage portion 2012 of the information processor 201 of FIG. 10;

FIG. 12 is a table showing an example of a data structure stored in a content information storage portion 2013 of the information processor 201 of FIG. 10;

FIG. 13 is a table showing an example of a data structure of a response information storage portion 1016 of the information processor 201 of FIG. 10;

FIG. 15 is an example of a template of a web page for linking a device control program, returned by the information processor 201 of FIG. 10;

FIG. 16 is a pseudocode of the device control program returned by the information processor 201 of FIG. 10;

FIG. 19 is an example of a data structure of a response information storage portion 1016 of the information processor 301 of FIG. 18;

FIG. 22 is a table showing an example of a data structure of a content class information storage portion 4011 of the information processor 401 of FIG. 21.

DETAILED DESCRIPTION

Figure 1:
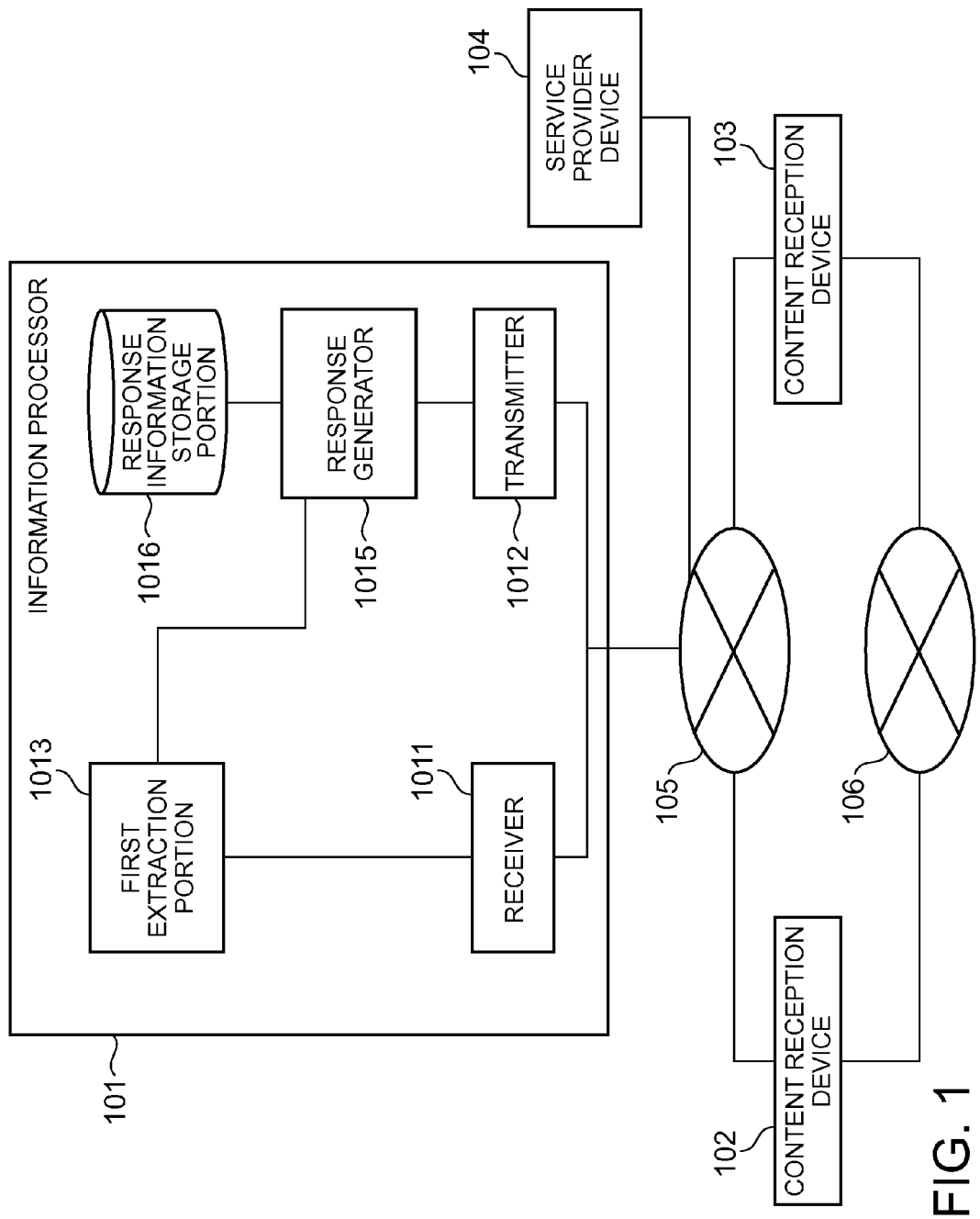
FIG. 1 is a block diagram showing a configuration of a system according to an embodiment of the invention.

According to an aspect of the invention, in a case where a plurality of users use a service in which a URI identifying a television program and an Internet service are linked, and where a first user uses a URI generated by a second user, the first user can receive the service using URI irrespective of the user environment.

An information processor according to an aspect of the invention includes: a receiver configured to receive, from a first device, a response information request including content identification information for identifying a content in a network; an extraction portion configured to extract a plurality of element information pieces included in the content identification information; a storage portion to store therein each of conditions for a first element information piece among the plurality of element information pieces, and a response information piece in association with each other; and a generator configured to generate a response message including the response information piece stored in association with a condition that the first element information piece extracted by the extraction portion satisfies among the conditions for the first element information piece stored in the storage portion.

EMBODIMENTS

Hereinbelow, modes for carrying out the invention will be described with reference to the drawings. Note that the same portions are denoted the same reference numerals in the drawings, and redundant descriptions are omitted.

FIG. 1 is a block diagram showing a configuration of an information processor 101 according to an embodiment.

A system according to the embodiment includes an information processor 101, content reception devices 102 and 103, and a service provider device 104. The information processor 101, the content reception devices 102 and 103, and the service provider device 104 are connected via a network 105. In addition, each of the content reception devices 102 and 103 includes a communication interface for receiving information from a network 106.

The information processor 101 includes a receiver 1011, a transmitter 1012, a first extraction portion 1013, a response generator 1015, and a response information storage portion 1016.

The receiver 1011 is configured to receive a response information request including content identification information from the content reception device 103. The content identification information is used to identify a content in a network.

The first extraction portion 1013 is configured to extract element information included in the content identification information received by the receiver 1011.

The response information storage portion 1016 is configured to store therein each condition for element information and a response information piece in association with each other, the element information being included in the content identification information. FIG. 2 shows an example of information stored in the response information storage portion 1016. The response information storage portion 1016 stores therein a response information piece in association with each of conditions for the element information.

The response generator 1015 is configured to generate a response message including a response information piece stored in association with a certain condition, from among the conditions for element information stored in the response information storage portion 1016. Specifically, the certain condition is the condition satisfied by the element information extracted by the first extraction portion 1013. For example, when the element information extracted by the first extraction portion 1013 satisfies condition 1 in FIG. 2, the response generator 1015 generates a response message including response information 1, which is stored in association with condition 1.

The transmitter 1012 is configured to transmit the response message generated by the response generator 1015, to the content reception device 103.

In the following first example, a concrete example of the above-mentioned embodiment will be described.

In the first example, a television program is used as an example of a content. In addition, a content URI is used as an example of content identification information. A content URI is an identifier for uniquely identifying a television program on the web. Additionally, four values including a network ID, a service ID, a transport stream ID, and a start time of a broadcast program, all of which are included in a content URI, are used as element information included in content identification information. Each of the four values is referred to as element information. Moreover, in the first example, conditions for element information included in content identification information and stored in the response information storage portion 1016 are assumed to be conditions for "start time of a broadcast program," which is one of the aforementioned four elements. More specifically, the conditions are assumed to be "whether or not the current time is before the start of the broadcast program." Moreover, a response information piece in the first example is a control command character string and a control command program path, as will be described later. Further, a response message in the first example is a web page in which a response information piece acquired from the response information storage portion 1016 is embedded. Additionally, the information processor 101 of the first example further includes a second extraction portion 1014.

First Example

Figure 3:
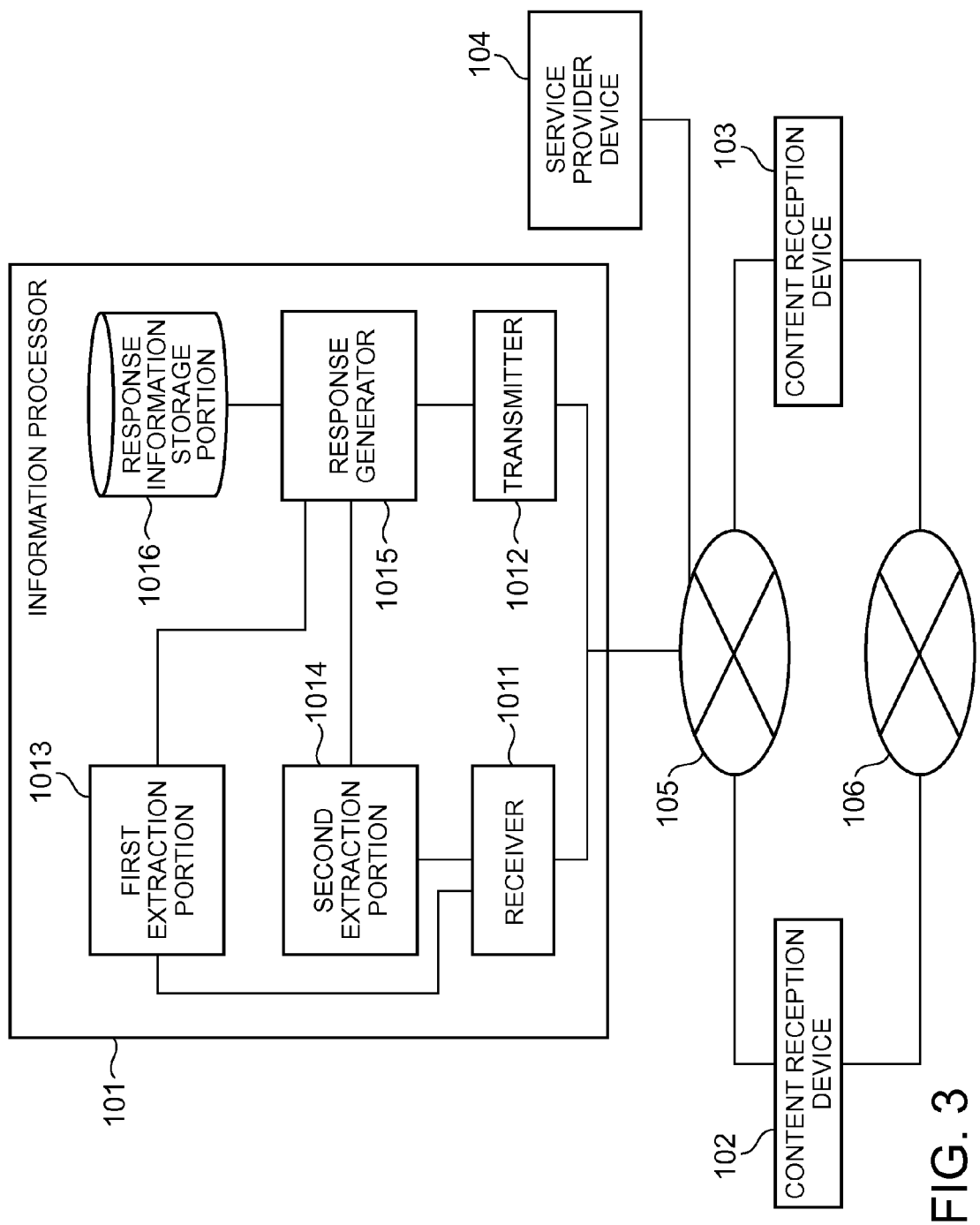
FIG. 3 is a block diagram showing a configuration of a system according to a first example of the invention.

Firstly, an outline of operations of the first example will be described. FIG. 3 is a block diagram showing a system according to the first example.

In FIG. 3, assume a case where user A views program 1 (content 1) on a digital television (content reception device 102). In this case, with an action of user A, such as pushing a "share" button on a remote controller, the content reception device 102 transmits a message "currently viewing this program (httP://tv.example.info/network_101/service_201/ts_301/20101201190000," for example, to a social network service. A URI included in this message is an identifier for uniquely identifying program 1 on the web (the identifier is hereinafter referred to as a content URI). The content URI is generated by the content reception device 102 by use of SI included in a broadcast wave. In this example, user B reads the message generated by the content reception device 102 on a digital television (content reception device 103). Here, if user B selects (clicks) the content URI, a web page on the information processor 101 associated with the URI is displayed on the content reception device 103. At this time, if the program is already started, a "view program" button is displayed on the web page, and if not, a "perform programmed-recording" button is displayed. By clicking the button displayed on the screen, user B can easily view or perform programmed-recording for the program transmitted by user A. As will be described later, in this example, the web page is switched between "view program" and "perform programmed-recording" according to a relationship between a start time or end time of the program corresponding to the URI generated by the content reception device 102, and a time when the URI is displayed on the content reception device 103. With this configuration, user B can view the program irrespective of the relationship between the above two times.

Next, the information processor 101 configured to return a web page in the above case is described with reference to FIG. 3.

The system according to the first example includes an information processor 101, content reception devices 102 and 103, and a service provider device 104. The information processor 101, the content reception devices 102 and 103, and the service provider device 104 are connected via a network 105. In addition, each of the content reception devices 102 and 103 includes a communication interface for receiving information from a network 106.

Then, the networks and devices included in the system of the first example are described.

The network 105 is assumed to be the Internet, or an IP (Internet Protocol) network being a closed network with assured quality such as an NGN (Next Generation Network). In this example, the network 105 is assumed to be the Internet.

The network 106 is a network for distributing contents, and is assumed to be a terrestrial digital broadcasting network, a satellite broadcasting network such as the BS or CS, cable television, an NGN, the Internet or the like. In this example, the network 106 is assumed to be a terrestrial digital broadcasting network The information processor 101 has a hardware configuration of a normal computer, including a CPU, a main memory, and an auxiliary memory. The information processor 101 includes a communication interface for connecting to the network 105 (the Internet), and provides a service on the Internet of returning a web page corresponding to a content URI.

Each of the content reception devices 102 and 103 has a hardware configuration of a normal computer as in the case of the information processor 101, and includes a display for displaying contents, and input/output interfaces such as a keyboard, a mouse, and a touch panel. Each of the content reception devices 102 and 103 also includes a communication interface for communicating with the network 105 and the network 106. Specifically, each of the content reception devices 102 and 103 is a digital audio-visual device such as a digital television or a hard disc recorder, a PC, a smartphone, a slate device or the like. In this example, both of the content reception devices 102 and 103 are assumed to be digital televisions.

The hardware configuration of the service provider device 104 is similar to that of the information processor 101. The service provider device 104 provides a social network service or the like, for realizing communication between users of the content reception devices 102 and 103 via the network 105. In this example, a microblog service is assumed as an example of the social network service.

Next, a description is given according to FIG. 3, of various functions implemented by a CPU of the information processor 101 through execution of various programs stored in the main and auxiliary memories.

The information processor 101 includes a receiver 1011, a transmitter 1012, a first extraction portion 1013, a second extraction portion 1014, a response generator 1015, and a response information storage portion 1016. All of the above components are generated on the main memory such as a RAM when the CPU executes a program.

Among these components, the response information storage portion 1016 is a database management system. Any scheme may be used, as long as the response information storage portion 1016 is provided with a function for storing data on a nonvolatile or volatile memory area, and acquiring data on the basis of a specified key. Relational database, XML (Extensible Markup Language) database, key-value store or the like may be used as the scheme for implementing the response information storage portion 1016, for example. The response information storage portion 1016 is not necessarily constructed from a single database management system, and may be a combination of a plurality of database management systems. The same goes with a conversion information storage portion, a device-type information storage portion, and a related content information storage portion mentioned in second and later-mentioned examples.

Hereinbelow, portions of the information processor 101 are described.

The receiver 1011 is configured to receive an acquisition request for a web page corresponding to a content URI, from the content reception device 103 in the network 105. A communication protocol used at this time may be one based on a TCP protocol such as HTTP or FTP, or maybe a unique protocol not limited to the TCP/IP-based protocol. In the examples, the receiver 1011 is a receiver of an HTTP server configured to receive an HTTP(S) request and both of the above protocols on the Internet.

The transmitter 1012 is configured to transmit, to the content reception device 102, a response (response information piece generated by the later-mentioned response generator 1015, specifically, a web page.) for the web page acquisition request. The transmitter 1012 uses protocols similar to those used by the receiver 1011. In this example, the transmitter 1012 is a transmitter of an HTTP server configured to transmit an HTTP(S) response.

The second extraction portion 1014 is configured to extract information on the transmission-source content reception device 103, included in the acquisition request for a web page corresponding to a content URI, and received by the receiver 1011. To be specific, by use of User-Agent header information included in an HTTP request, the second extraction portion 1014 performs processing for extracting a type of web browser, a screen size, device-type information, and the like, and processing for extracting area information from an IP address or the like. Although in this example the above processing based on HTTP is assumed, other mechanisms for extracting transmission-source device information based on other communication protocols may be used instead.

The first extraction portion 1013 is configured to extract information such as an area where the content is broadcasted, a broadcaster, and a broadcast time, from the content URI received by the receiver 1011. In a terrestrial digital broadcasting network, a combination of four values including a network ID, a service ID, a transport stream ID, and a start time which are included in a broadcast wave as SI, can be used as information for uniquely identifying a content. A network ID is information indicating a communication network of the granularity of terrestrial broadcasting, BS broadcasting, CS broadcasting and the like. A service ID is information for identifying a broadcaster, and instead of being an identifier unique in a broadcaster group, a service ID is identification information assigned to each local broadcaster. A transport stream ID is a number for identifying a stream (MPEG-2 TS) transmitted by a broadcaster. A start time is the start time of a broadcast program. A program can be uniquely identified with these four values.

In a case where a content URI is configured to include the four values, the first extraction portion 1013 extracts the four values by URI analysis. To be precise, when the network ID is 101, the service ID is 201, the transport stream ID is 301, and the start time is 1 Dec. 2010 19:00, the content URI is expressed as follows, for example. The first extraction portion 1013 performs processing to obtain the respective values from the URI:

http://tv.nameservice.com/n_101/s_201/t_301/20101201190000.

Note that the form of a content URI is not limited to the above format. Other methods may be used for the case where the subject is a broadcast content, such as using event ID information instead of the start time information. Any other format may be used, as long as information for uniquely identifying the content in the network 106 is included.

The response generator 1015 is configured to generate a response information piece corresponding to a content URI, on the basis of information extracted by the first extraction portion 1013 and the second extraction portion 1014. As the response information piece, various data forms can be assumed such as an HTML data (web page), an XML data, JSON (JavaScript Object Notation) data, and the like. Here, the response generator 1015 returns a web page. In this example, start time information extracted by the first extraction portion 1013 is used, for example. When the current time is after the start time of the program, returned is a web page including a channel change button and a channel change command program according to the device type, executed by the push of the button as a trigger. On the other hand, when the current time is before the start time of the program, returned is a web page including a programmed-recording button and a programmed-recording command program according to the device type, executed by the push of the button as a trigger.

The response information storage portion 1016 is configured to store therein information extracted by the first extraction portion 1013 and the second extraction portion 1014, in association with a response information piece. Additionally, upon receipt of a response information acquisition request using the attribute information from the response generator 1015 as a key, the response information storage portion 1016 returns a corresponding response information piece. FIG. 4 shows an example of a data structure of the response information storage portion 1016. As shown in FIG. 4, the data structure is formed of four columns including: a content tense (called time condition) (a boolean value indicating whether or not it is before the start time), a control command character string (a character string to be displayed on a button, such as "perform programmed-recording," and "view program"), and a control program path. This is a data structure specialized for a simple objective of displaying on a web page a single operation button (two types including "perform programmed-recording" and "view program") for a given content. The data structure may be formed of more or less information, depending on the content of the web page to be returned. Note that although this example only describes processing according to a start time, processing according to an end time may also be assumed as a variation of the processing. For example, whether or not the current time is before the end time may be inputted as a column name in FIG. 4, and the response information piece may be changed according to whether or not the current time is before the end time. In this case, whether or not it is before the end time is determined by acquiring the end time of a content and comparing it with the current time. Such start time and end time are referred to as time conditions. Moreover, the time conditions of FIG. 4 correspond to the conditions for element information in FIG. 2. Furthermore, the control command character string and the control command program path correspond to the response information piece in FIG. 2. As shown in FIG. 4, the response information storage portion 1016 of the first example stores therein a response information piece for each of entries and for each of conditions for element information.

Figure 5:
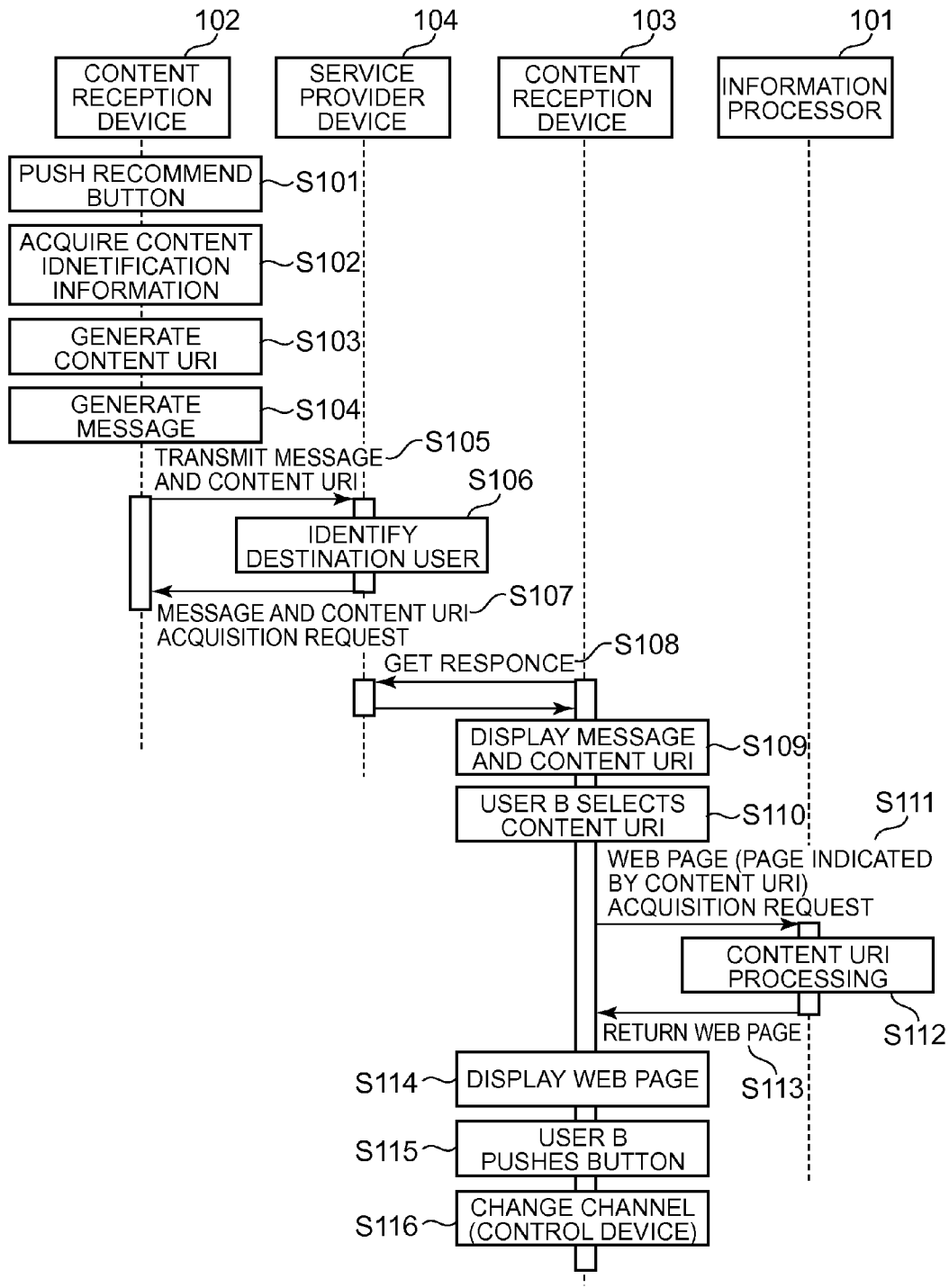
FIG. 5 is a chart showing the sequence of operations of devices in a system including the information processor 101 of FIG. 3.
Figure 6:
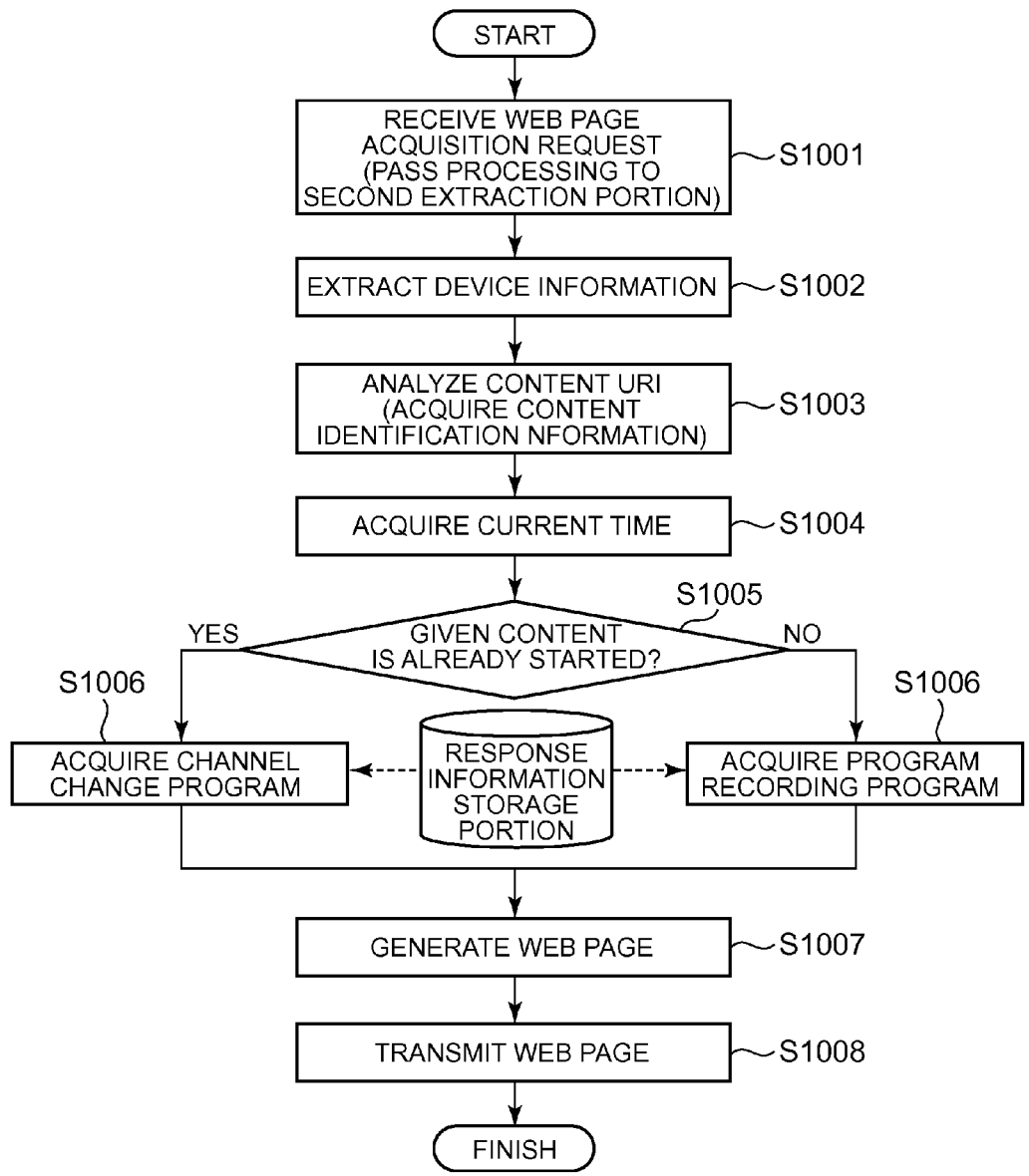
FIG. 6 is a flowchart of internal processing of the information processor 101 of FIG. 3.
Figure 9:
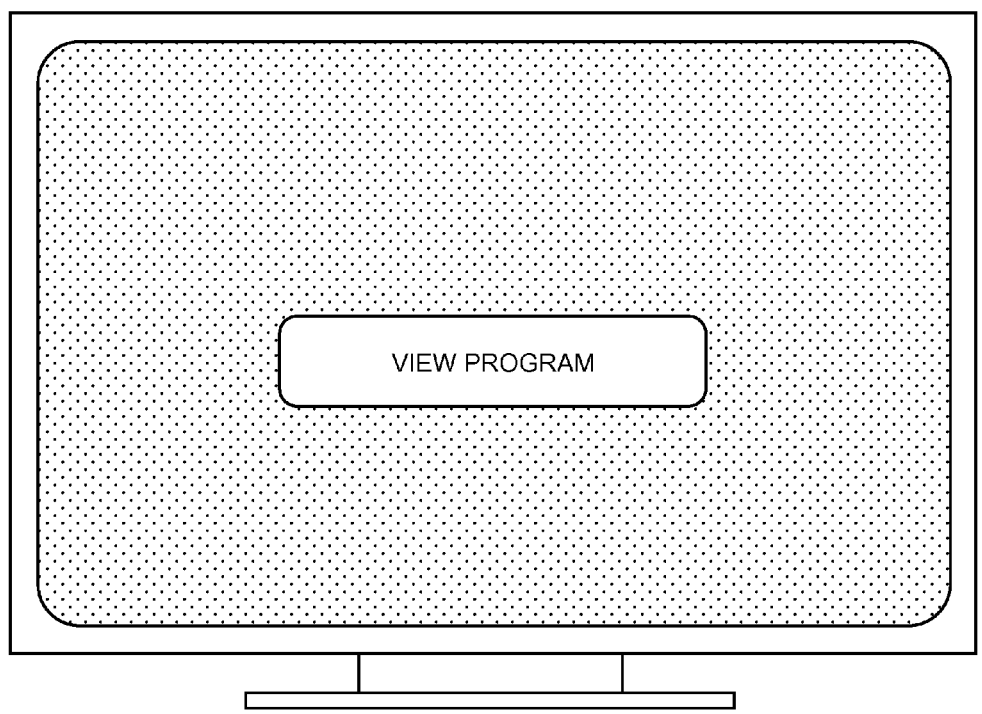
FIG. 9 is a diagram showing an example of a web page displayed on a content reception device 103 of FIG. 3, as the web page to which a content URI is linked.

Next, operations of the information processor 101 according to this example will be described with reference to FIG. 3 to FIG. 9. FIG. 5 is a chart showing the sequence of operations of components of a system including the information processor 101 of this example. FIG. 6 is a flowchart of internal processing of the information processor 101. FIG. 7 is an example of a template of a web page returned by the information processor 101. FIG. 8 shows a pseudocode of a device control program. FIG. 9 is a diagram showing an example of a web page displayed on a content reception device 103, as the web page to which a content URI is linked.

Firstly, the number of users is assumed to be two as a premise for this example. The users are a user (user A) of the content reception device 102, and a user (user B) of the content reception device 103. Both user A and user B subscribe to an SNS provided by the service provider device 104, the SNS realizing communication with other users. In addition, an SNS client function for transmitting messages to the SNS or reading messages is installed in the content reception devices 102 and 103.

Hereinafter, a processing procedure will be described on the basis of the sequence chart of FIG. 5. FIG. 5 is a chart showing the sequence of operations of devices of a system including the information processor 101.

At first, user A pushes a button "recommend this program" on a remote controller or displayed on a display while viewing a content (a terrestrial digital broadcast program) on the content reception device 102 (step S101). In response to the event that the button is pushed, the content reception device 102 acquires information for identifying the currently-received program (four values including a network ID, a service ID, a transport stream ID, and a start time) from SI (step S102). Subsequently, the content reception device 102 generates a content URI by using the four values (step S103). As mentioned above, when the network ID of the currently-received program is 101, the service ID 201, the transport stream ID 301, and the start time of the program 1 Dec. 2010 19:00, the generated content URI is http://tv.nameservice.com/n__101/s__201/t__301/20101201190000. Then, the content reception device 102 generates a message in which the generated content URI is cited (such as "currently viewing this program httP://tv.nameservice.com/n__101/s__201/t__301/20101201190000") (step S104). At this time, as in the case of a network ID and the like, character string information of a title of the program may be acquired from SI and be included in the message ("currently viewing program xxx. http:// . . . "), or a textbox in which a content URI is inputted by default may be displayed to prompt a user to input a message. Any format or form may be used to generate the message. The content reception device 102 transmits the generated message to the service provider device 104 in the network 105 (step S105). Although the message is transmitted by the HTTP POST method in this example, other methods such as HTTP PUT or GET may be used, or protocols other than HTTP may be used.

Upon receipt of the message from the content reception device 102, the service provider device 104 identifies user B who subscribes to messages from user A (step S106), and transmits the message to user B (i.e., the content reception device 103). This transmission sequence may be realized by: polling in which the SNS client on the content reception device 103 periodically makes inquiries to the service provider device 104 as to whether or not a message has been transmitted; or the service provider device 104 pushing messages to the concept reception devices. The former method is used in this example. To be concrete, the content reception device 103 requests for new messages from the subscription target (user A) by an HTTP GET request (step S107), and receives the result (step S108). Here, as in the case of step S105, various schemes (communication protocols) can be used as the communication protocol. Note that as for the latter method, conceivable methods include: a method in which the content reception device 102 serves as an HTTP client and the content reception device 103 serves as an HTTP server; HTTP long polling; and a method of using Websocket, whereby the content reception device 103 establishes and maintains a TCP connection with the service provider device 104, and the service provider device 104 uses this connection to transmit messages to the content reception device 102.

Then, the content reception device 103 displays the message received from user A on the screen of the content reception device 103 (step S109). With processing up to this step, the message including the content URI transmitted by user A is displayed on the screen of the content reception device 103 of user B.

Here, user B reads the message "currently viewing this program httP://tv.nameservice.com/n_101/s_201/t_301/20101201190000" from user A, and selects the content URI (step S110). The content URI is selected by clicking with a pointing device. Otherwise, various ways are conceivable, such as selecting and determining with a remote controller. With this selection processing as a trigger, the content reception device 103 accesses the information processor 101 (i.e., transmits an acquisition request for a web page associated with the content URI) (step S111). This is the same as the normal method of following a hyper link in HTML, and is realized by an HTTP GET request.

The information processor 101 receives the web page acquisition request, performs content URI processing (analysis of the content URI and generation of a corresponding web page) (step S112), and returns a web page corresponding to the content URI to the content reception device 103 (step S113).

Here, the content URI processing performed by the information processor 101 in step S112 will be described by use of a flowchart in FIG. 6.

The receiver 1011 of the information processor 101 receives the web page acquisition request, and forwards it to the second extraction portion 1014 (step S1001). The second extraction portion 1014 extracts information related to the transmission-source content reception device 103 from information included in the acquisition request (step S1002). To be specific, the second extraction portion 1014 acquires, from a User-Agent header included in the HTTP request, type and version of a web rendering engine installed in the content reception device 103, and screen size information. A screen size is acquired in this step to determine a layout of the web page. Thereafter, the first extraction portion 1013 analyses the content URI itself to obtain four values for uniquely identifying the content in terrestrial digital broadcast (a network ID, a service ID, a transport stream ID, and a start time) (step S1003). As described above, the respective values are 101, 102, 103, and 1 Dec. 2010 19:00 in this example. Next, with the screen size extracted by the second extraction portion 1014 and the four values extracted by the second extraction portion 1013 inputted thereto, the response generator 1015 acquires a current time (access time) from the system (step S1004), and compares the current time to the start time of the content to determine whether or not the current time is before the start time of the content (step S1005). Subsequently, the response generator 1015 acquires a control command character string and a control command program path (URL: Universal Resource Locator) from the response information storage portion 1016, by using the device-type information and the boolean value indicative of whether or not it is before the start time, as a key (step S1006). In this example, assuming that the time of the acquisition request from the content reception device 103 (i.e., the current time) is after the start time of the content, the first entry in FIG. 4 (http://tv.nameservice.com/apis/changeChannel.js) is acquired. The response generator 1015 embeds path information for a device operation program, a control command character string, and the four values obtained from the content URI, in a web page template whose example is shown in FIG. 7. To be precise, the response generator 1015 embeds the respective values in $1, $2, $3, $4, $5, and $6 of FIG. 7 to generate the response message (web page) (step S1007), and transmits the response message (step S1008).

Next, operations of the content reception device 103 will be described with reference to FIG. 5. Upon receipt of the response message from the information processor 101, the content reception device 103 displays the message on the display (step S114). An example of the displayed web page is shown in FIG. 9. In this example, the "view program" button is displayed. When user B pushes the displayed button (step S115), a channel change API (Application Program Interface) (device.execute (networkId, serviceId, transportStreamId, startDate)) of row &&&TODO in FIG. 8 is called. In this example, the device control function (setChannelNative (networkId, serviceId, transportStreamId)) called inside the API actually changes a reception channel of the content reception device 103 according to the given parameter (step S116). Note that in a case where the time when user B clicks the content URI is before the start time of the content, the information processor 101 acquires a control program for programmed-recording in step S1006, and the button displayed on the content reception device 103 is "perform programmed-recording."

As has been described, with the information processor 101 of the first example, a content URI can be shared among a plurality of devices and a device can be easily operated by the content URI, according to a change in the content tense (whether or not it is after the start time) at the time point of processing the content URI. In other words, the content URI can be shared and the device can be easily operated irrespective of the difference in the attribute value (the content tense) between the transmission side (the content reception device 102) and the reception side (the content reception device 103). In this example, operation steps taken by user B for changing the channel and performing programmed-recording in the content reception device 103 are two steps including: selection of the content URI; and push of the button on the web page displayed as a result of the selection. Furthermore, the user action of pushing the button may be omitted, and the above device.execute function may be executed automatically by using the reading of the web page by the content reception device 103 as a trigger. In this case, user B can actually operate the device with a single action of following (clicking) the link of the content URI.

Note that the information processor 101 can be implemented by using a general computer as basic hardware, for example. In other words, the receiver 1011, the transmitter 1012, the first extraction portion 1013, the second extraction portion 1014, the response generator 1015, and the response information storage portion 1016 can be implemented by causing a processor installed on the aforementioned computer to execute a program. At this time, the information processor 101 may be implemented by: previously installing the above program on the computer; or appropriately installing the program on the computer by storing the program in a storage medium such as a CD-ROM, or by distributing the program via a network. In addition, the response information storage portion 1016 can be implemented by appropriately using an internal or external memory of the computer, a hard disc, or a storage medium such as a CD-R, a CD-RW, a DVD-RAM, and a DVD-R.

Second Example

Next, an information processor 201 of a second example will be described with reference to FIG. 10.

Firstly, a concrete case assumed in the second example will be described.

As in the first example, the main part of the case is that user B reads a message from user A in which a content URI is cited, and controls a device by clicking the content URI. There are two differences between the second example and the first example. The first point is that a broadcast area to which user B belongs is different from a broadcast area to which user A belongs. The information processor 201 enables user A and user B to smoothly receive the service using a content URI even though user A and user B belong to different broadcast areas. The second point is that although all types of devices to be operated (referred to below as "operation target device") use a common API in the first example, this is not the case for the second example. Specifically, in the second example, the information processor 201 has a different API set for accessing from a web page for each device type or manufacturer of the operation target device, and can change the API to be called depending on the operation target device.

Figure 10:
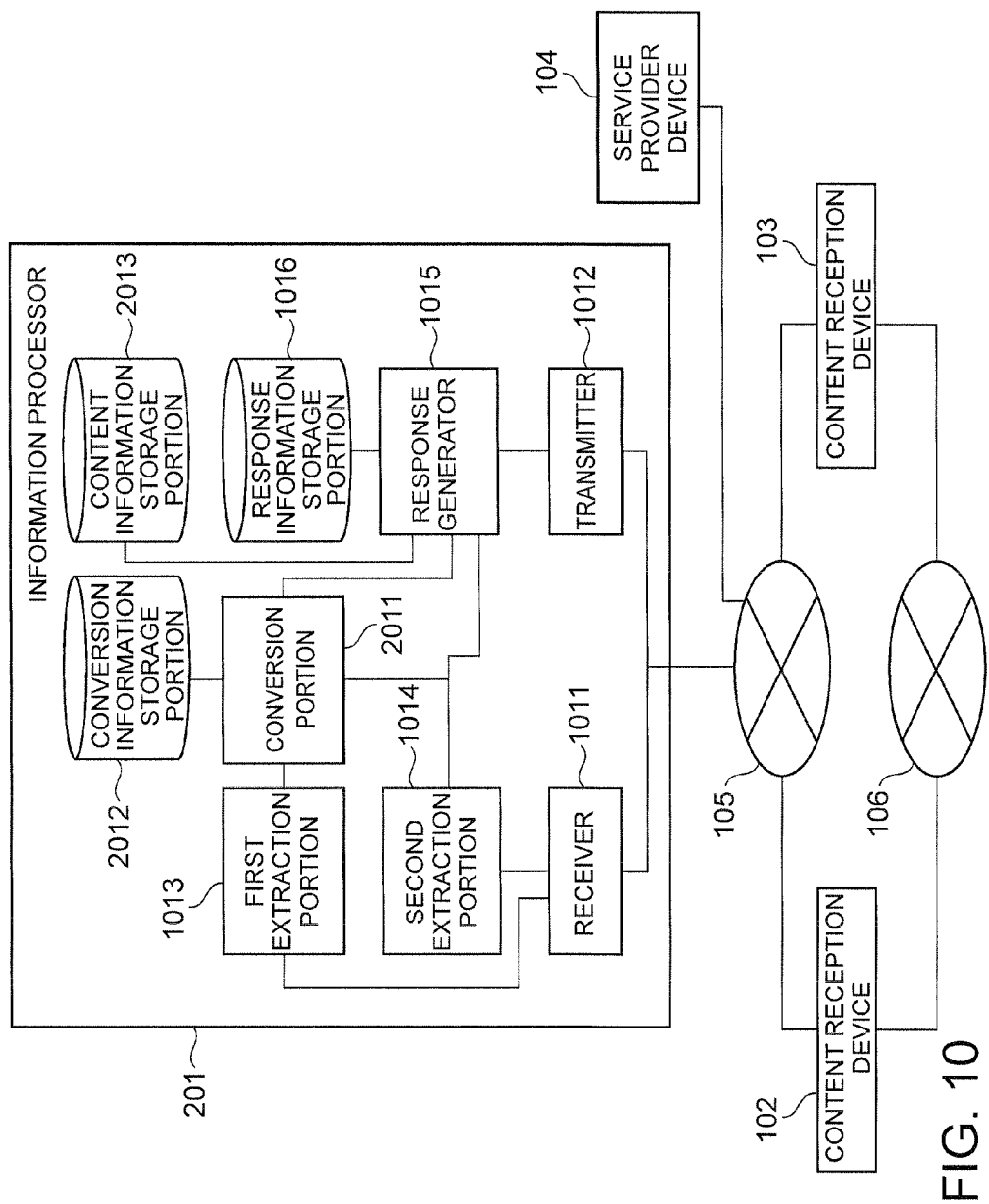
FIG. 10 is a block diagram showing a configuration of a system including an information processor 201 according to a second example.
Figure 14:
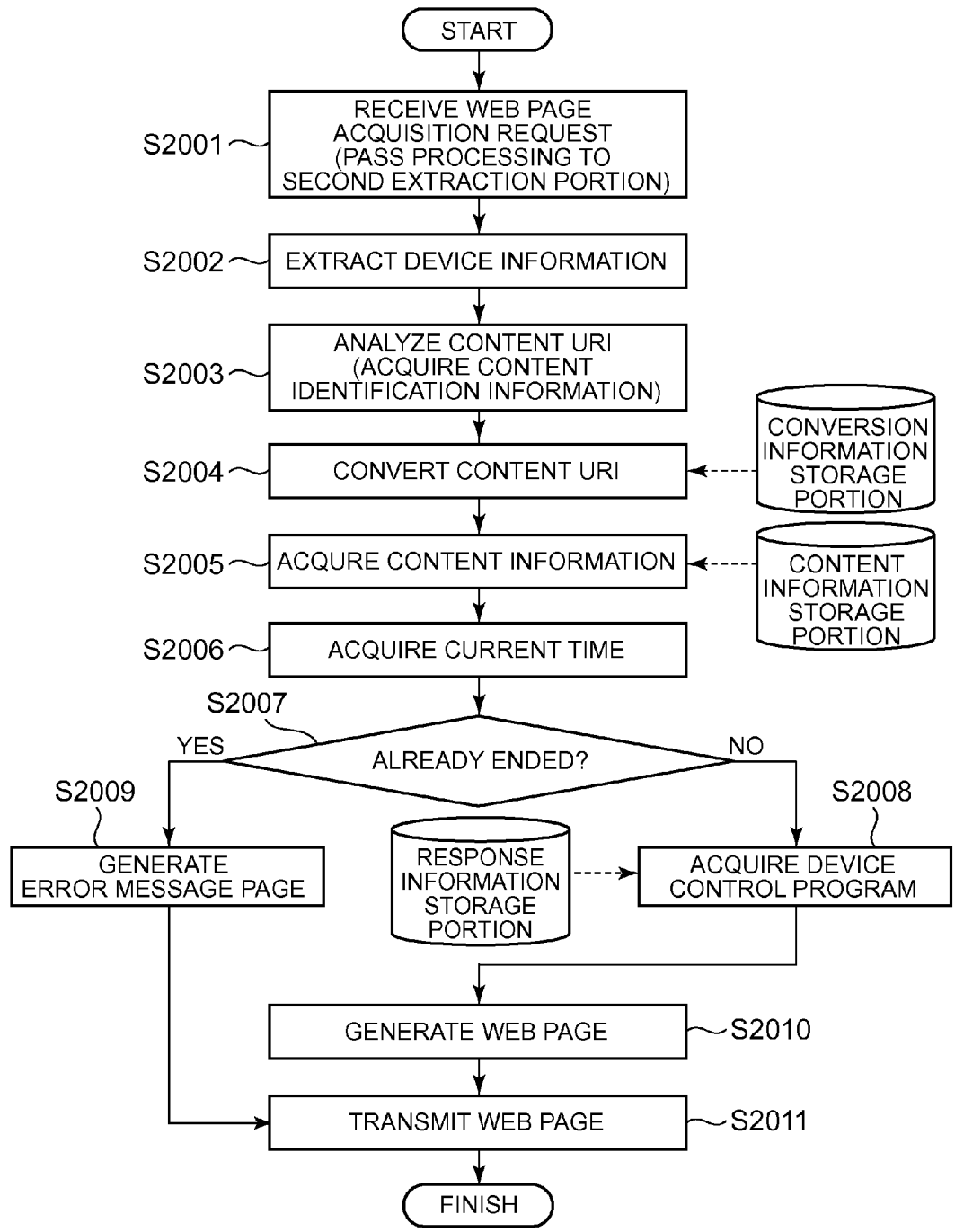
FIG. 14 is a flowchart showing operations of the information processor 201 of FIG. 10.

FIG. 10 is a block diagram showing a configuration of the information processor 201.

Hereinbelow, the difference between the information processor 201 and the information processor 101 will be described.

The hardware configuration of the information processor 201 is similar to that of the first example, except that a conversion portion 2011, a conversion information storage portion 2012, and a content information storage portion 2013 are added thereto as new functional blocks. All of these components are generated on a main memory such as a RAM when the CPU executes a program.

At first, the new functional blocks will be described as the difference between the information processor 201 and the information processor 101.

The conversion portion 2011 is configured to convert a content URI according to an environment of the source of a web page acquisition request. At this time, the conversion is carried out on the basis of information extracted by a second extraction portion 1014 and information stored in a later-mentioned conversion information storage portion 2012. In this example, a network ID and a service ID (and a transport stream ID) to be included in identification information on a broadcast content included in a content ID are changed, according to a channel lineup in a broadcast area of a content reception device 103.

The conversion information storage portion 2012 is configured to store therein information to be used in the conversion of content URI by the conversion portion 2011. For example, in this example, the conversion information storage portion 2012 manages correspondence relationships among channel lineups in respective areas. FIG. 11 shows an example of a data structure stored in the conversion information storage portion 2012. The conversion portion 2011 configured to manage broadcaster information (a network ID and a service ID (and a transport stream ID)) for each area and each broadcaster group as in FIG. 11, uses the conversion information storage portion 2012 for conversion. Specifically, the conversion portion 2011 uses the conversion information storage portion 2012 to identify a broadcaster group from a network ID and a service ID of a content URI, generated by a content reception device 102, finds a network ID and a service ID of this broadcaster group in the broadcast area of the content reception device 103, and converts the content ID with these values. That is, FIG. 11 shows a data structure which assumes use of broadcast area information included in device information for conversion of a content URI, and the conversion target to be the broadcaster information (network ID+service ID). This is only an example, and numerous variations are conceivable. For example, the conversion target may be the network ID (such as conversion from terrestrial to BS) alone, or the conversion target may also include a start time of the content (a case where the start time differs among areas).

The data structure of the conversion information storage portion 2012 differs depending on the variation, and includes information on the conversion target and information to be used for conversion in each of the variations.

Note that the information shown in FIG. 11 corresponds to first conversion information, and the broadcast area of the content reception device 103 corresponds to first information on a first device. The content information storage portion 2013 stores therein content identification information and various attributes (metadata) of contents. Examples of attributes include a program title, a category, members of the cast, a description of the program, and a start time or end time (or a length of the program). FIG. 12 is a table showing an example of a data structure stored in the content information storage portion 2013 of the information processor 201. In this example, as shown in FIG. 12, a title, a start time, an end time, and a description of the program are managed in the content information storage portion 2013. This configuration is only an example, and various program metadata currently included in SI of the broadcast wave, products related to the program, and information accompanying programs such as similar programs and serial programs may also be managed together with the data structure in FIG. 12.

As a difference between the information processor 201 and the information processor 101, components which are also included in the information processor 101 but have different functions in the information processor 201 will be described.

Figure 17:
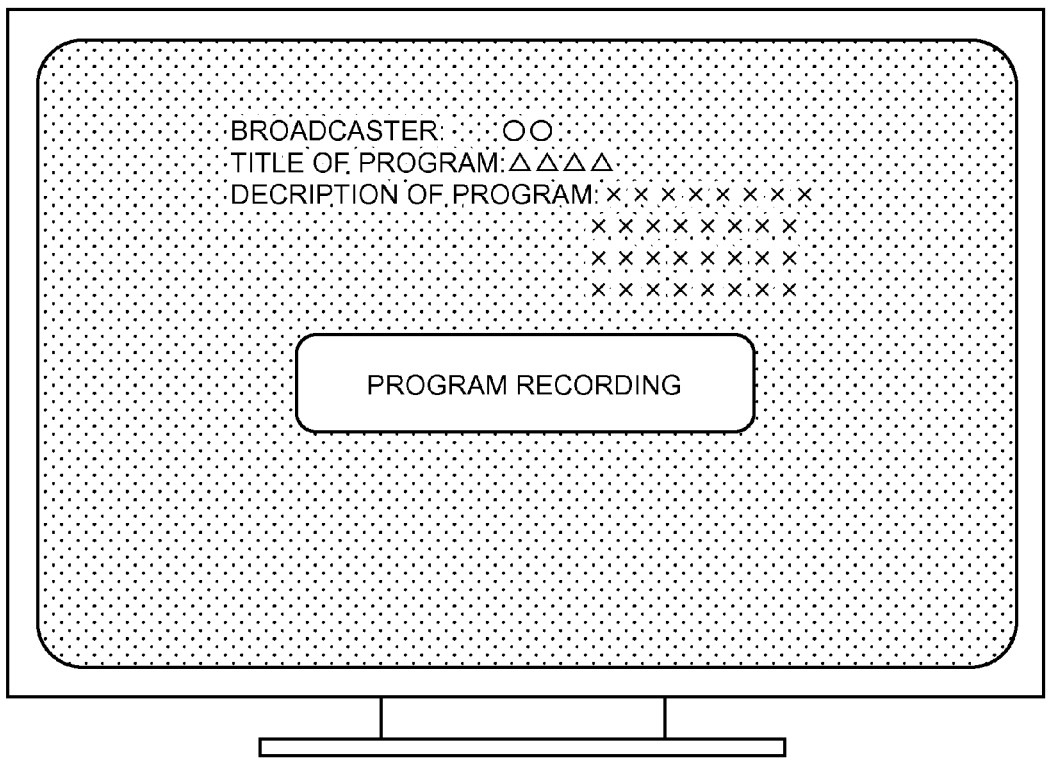
FIG. 17 is a diagram showing an example of a web page displayed on a content reception device 103 of FIG. 10.

Modifications in the data structure of a response information storage portion 1016 of the information processor 201 will be described as compared to the response information storage portion 1016 of the information processor 101. FIG. 13 shows an example of a data structure of the response information storage portion 1016 of the second example. Points different from the first example are that device-type information is added and that a different control command program path is provided for each piece of device-type information. That is, in a case where an interface (API) for externally opened functions of the content reception device (such as channel changing and programmed-recording) differs among device types, a response information piece (control command program) corresponding to the device-type information of the access source (content reception device) is required. The device-type information (condition 1) in FIG. 13 corresponds to the condition for device information of the access-source device, extracted by the second extraction portion 1014. In addition, "whether or not it is currently on air" (condition 2) in FIG. 13 corresponds to the condition for element information in FIG. 2. Moreover, the control command character string and the control command program path in FIG. 13 correspond to the response information piece in FIG. 2. The response information storage portion 1016 of the second example stores therein a response information piece (a control command character string and a control command path) for each of entries and for each of conditions for device information (condition 1) and conditions for element information (condition 2). Next, operations of the information processor 201 will be described with reference to FIG. 10 to FIG. 17. FIG. 17 is a flowchart showing internal processing of the information processor 201. FIG. 15 and FIG. 16 each show an example of a template of a web page returned by the information processor 201 of this example, and a pseudocode of a device control program to be linked to the web page. FIG. 17 is a diagram showing an example of a web page displayed on the content reception device 103, as the web page to which a content URI is linked.

The system configuration of the second example is similar to that of the first example, and the communication sequence among components of the system is the same as the first example, which is shown in FIG. 5. Here, only the points different in the second example will be described with reference to FIG. 3.

The first difference is that the content reception device 103 transmits information on a broadcast area to which it belongs, in an acquisition request for a web page corresponding to a content URI (step S111). The information on the broadcast area may be transmitted by being added as a query character string to the content URI at the time of transmission by the HTTP GET method, or may be transmitted by adding an independent item in a request header and embedding the information in this field. Otherwise, the information on the broadcast area may be provided in the form of a request in the HTTP POST method and be embedded in a request body. Note that as a different method, the information processor 201 may calculate the broadcast area to which a user belongs by use of an IP address or information on network nodes through which the user communicates. Although accuracy of this method is lower than those described above, the need for the content reception device 103 to explicitly transmit the broadcast area information is eliminated.

The second difference is the content URI processing by the information processor 201 (step S112). This will be described by use of the flowchart in FIG. 14. The point different from the first example (FIG. 6), firstly, is that content URI conversion processing is inserted after content URI analysis processing (step S2003). The conversion portion 2011 uses the conversion information storage portion 2012 to convert a content URI in an environment of user A into a content URI adjusted to an environment of user B.

For example, when user A is in Tokyo and user B is in Osaka, according to information in FIG. 11, three values including a network ID (101), a service ID (201), and a transport stream ID (301), as well as a broadcast area of user A (Tokyo) indicate that a broadcaster group identifier of a program that user A is viewing is 1. From the same broadcaster group identifier (1) and the broadcast area to which user B belongs (Osaka), the above three values of the content in the environment of user B are 101, 203, and 303. Specifically, the converted content URI is expressed as httP://tv.nameservice.com/n_101/s_203/t_303/20101201190000.

Note that this converted content URI is only an example of serialization into a content URI form, and actually, it suffices that only content identification information included in a content URI (four values including a network ID, a service ID, a transport stream ID, and a start time in this example) be converted as internal processing of the information processor 201.

Processing of the conversion portion 2011 includes deriving ServiceGroupId from pre-conversion four values {AreaId, NetworkId, ServiceId, TransportStreamId}, and using this ServiceGroupId and post-conversion AreaId to obtain post-conversion {NetworkId, ServiceId, TransportStreamId}.

Subsequently, the response generator 1015 acquires content information from a (pre- or post-conversion) content URI by use of the information shown in FIG. 12 (step S2005). By thus acquiring content information, the response generator 1015 can include program information in a generated web page as shown in FIG. 17. In addition, by referring to an end time (or length) of the program, the response generator 1015 can determine whether or not the program is ended at the current time. Although only the start time is used for determining the tense in the first example, use of the end time makes it possible to determine whether or not the program is currently on air as in FIG. 14. In the second example, the current time is checked, (step S2006), and if the program is already ended, an error message page (such as "this program is already ended") is generated (step S2009), and transmitted (step S2011). Meanwhile, if the program is not ended, pieces of information to be set in a web page template whose example are shown in FIG. 15, such as a device control program according to the device type and a display character string, are acquired from the response information storage portion 1016, on the basis of the tense and device-type information extracted by the second extraction portion 1014 (step S2008). The pieces of information are set in a template, a web page is thereby generated (step S2009), and transmitted (step S2010). As shown in FIG. 15, the web page template includes additional variables ($2, $3, and $4) for inserting a broadcaster, a title, and a program description acquired from the content information storage portion 2013. The response generator 1015 embeds, in the template shown in FIG. 14, a total of nine variables, including these three values, acquired from the content information storage portion 2013 and the response information storage portion 1016. The above are the points in the content URI processing different from the first example.

The third difference is in the web page displayed on the content reception device 103 (step S114). As shown in FIG. 17, information from the content information storage portion 2013 is reflected on the web page.

The fourth difference is in the device control program to be executed with the push of a button. As shown in FIG. 16, a function called in an API (programmed-recording) is reserve_42xx001( ). To be specific, a code for a 42×001 digital television is embedded. Since the response generator 1015 links a device control program according to the device type, the second example is applicable even when there is no standard for the API for accessing internal functions.

As has been described, according to the second example, a content URI is converted in accordance with the environment of the user, so that a content URI can be processed appropriately (a device can be actually operated) even when user A and user B belong to different broadcast areas. In addition, a control program according to the device type is dynamically embedded, so that a device can be actually operated by use of the content URI even when there is no standard API for using the internal functions of the device.

Third Example

Figure 18:
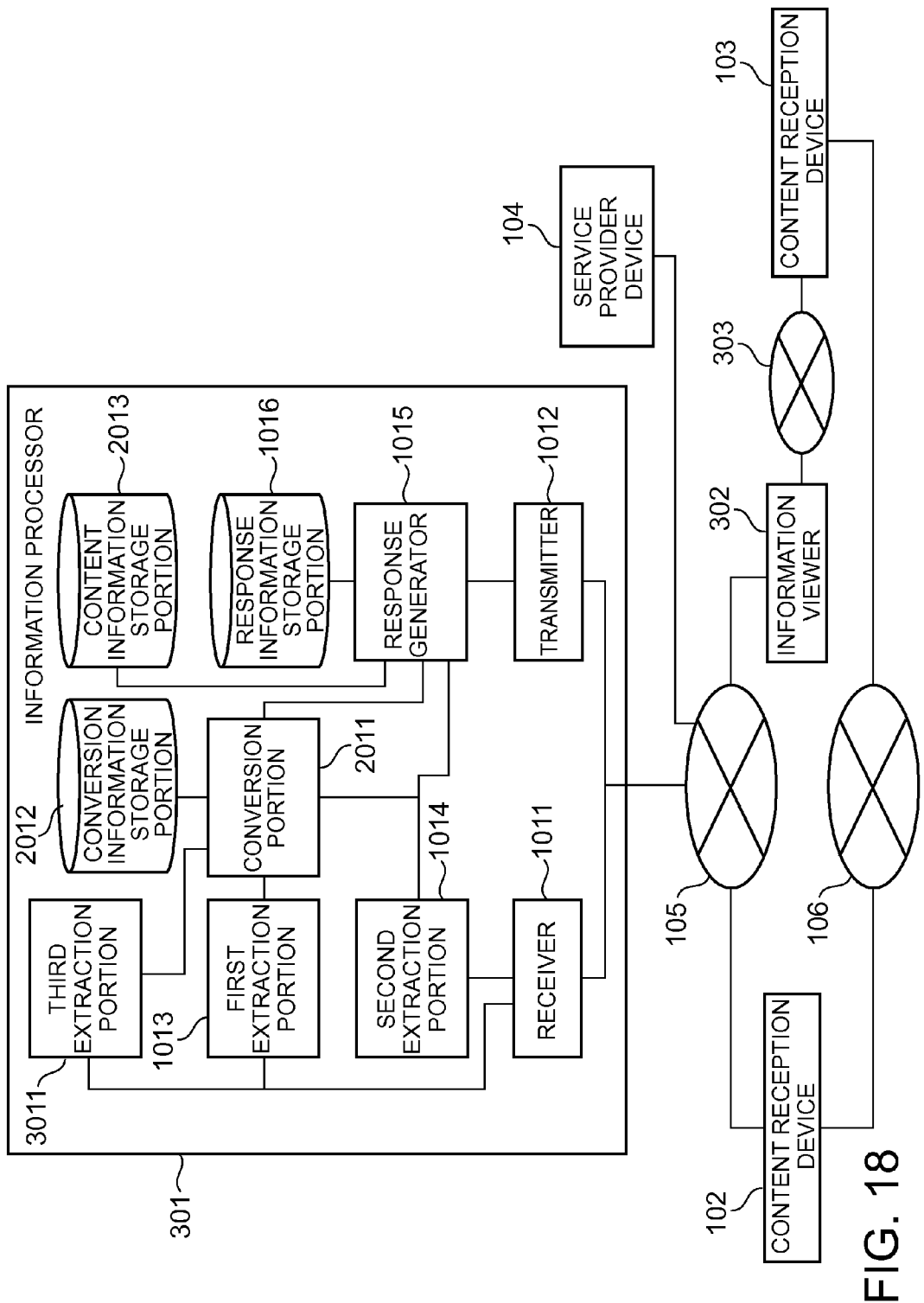
FIG. 18 is a block diagram showing a system including an information processor 301 according to a third example.

FIG. 18 shows an information processor 301 according to a third example.

Firstly, a concrete case assumed in the third example will be described.

As in the first and second examples, the main part of the case is that user B reads a message from user A in which a content URI is cited, and controls a device by clicking the content URI. There are two differences between the third example and the first and second examples. The first point is that user B operates a PC or a tablet-type device instead of the digital television (content reception device 103). Specifically, user B views an SNS on a laptop PC in front of a television, and with a click on a content URI presented by user A, the content reception device 103 is controlled via a network. The second point is that the device is assumed to be controlled to reproduce a program if it is recorded, even in a case where broadcast of the program is ended.

FIG. 18 is a system configuration diagram including functional blocks of the information processor 301 according to the third example of the invention. A point in the system configuration different from the first example (FIG. 3) is that a network 303 and an information viewer 302 are added thereto.

Here, as in the case of the network 105, the network 303 is an IP (internet protocol) network, and more particularly, a home LAN is assumed.

The information viewer 302 corresponds to the laptop PC in the aforementioned case of this example. For this reason, the information viewer 302 has a hardware configuration of a normal computer, which includes a CPU, a main memory and an auxiliary memory like the content reception device 102 or 103.

Next, the point in the information processor 301 different from the information processor 201 according to the second example will be described. The hardware configuration of the information processor 301 is similar to that of the information processor 201, except that a third extraction portion 3011 is added thereto as a new functional block.

The third extraction portion 3011 is configured to extract operation target device information or protocol information to be assigned by the information viewer 302 at the time of transmitting a web page acquisition request. Specifically, when the information viewer 302 does not actually operate its own device (channel change and the like) using a content URI, the information viewer 302 includes, in the web page acquisition request, device-type information on peripheral devices, and information on protocols for detecting and remotely operating the peripheral devices. The information may be added by using an existing HTTP request header, a new HTTP request header may be provided, the information may be included in a request URL (i.e., a content URI), or an HTTP POST request may be used where the information is written in an HTTP payload.

Figure 20:
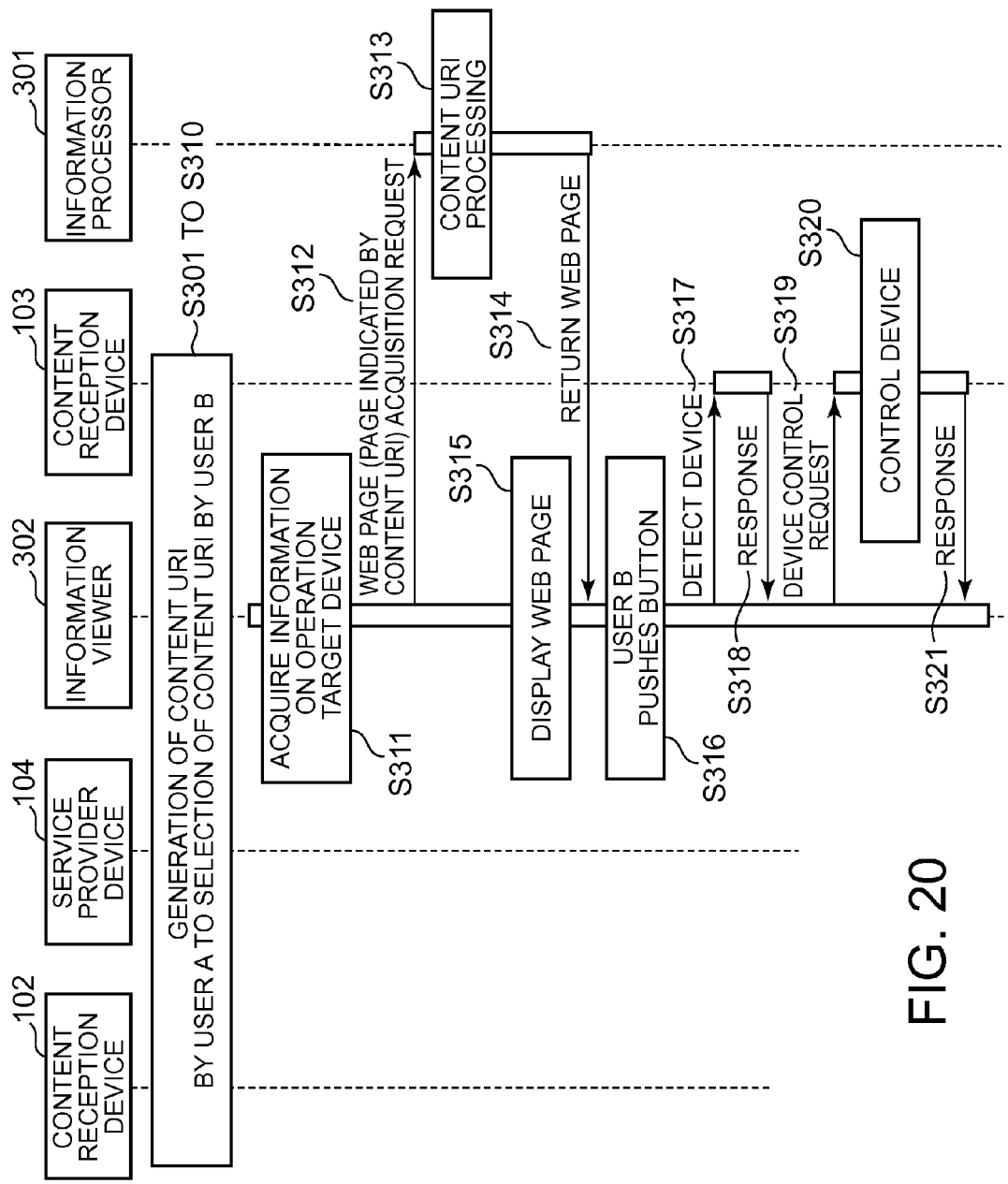
FIG. 20 is a sequence chart showing operations of devices in a system including the information processor 301 of FIG. 18.

Next, modifications in the data structure of the response information storage portion 1016 will be described. FIG. 19 shows an example of a data structure of the response information storage portion 1016 of this example. As a point different from the response information storage portion 1016 of the second example, control protocol information is added. The control protocol information is used by the content reception device 103 to identify a control protocol for requesting operation by a content URI to a peripheral device. The device-type information (condition 1) in FIG. 19 corresponds to the condition for device information of the access-source device, extracted by the second extraction portion 1014. The "tense" (condition 3) in FIG. 19 corresponds to the condition for element information in FIG. 2. In addition to the above conditions, a condition for control protocol information (condition 2) is further stored in the third example. Moreover, the control command character string and the control command program path in FIG. 19 correspond to the response information piece in FIG. 2. The response information storage portion 1016 of the third example stores therein a response information piece (control command character strings and control command paths) for each of entries and for each of conditions for device information (condition 1), conditions for control protocol information (condition 2), and conditions for element information (condition 3). Next, operations of the information processor 301 will be described with reference to FIG. 14 and FIGS. 18 to 20. FIG. 20 shows a basic sequence among components of a system including the information processor 301.

Hereinbelow, a processing procedure will be described on the basis of the sequence chart of FIG. 20.

Firstly, processing from steps S301 to S310 is the same as steps S101 to S110 in the first example, and thus is omitted. With processing up to this point, a message transmitted by user A including a content URI (assumed to be http://tv.nameservice.com/n_101/s_201/t_301/20101201190000 as in the first example) is displayed on a screen of the information viewer 302 of user B, and user B has clicked the content URI.

As for the operations hereafter, only points different from the second example are described.

The first difference in the operation sequence is that operation device information acquisition processing in step S311 is added. The information viewer 302 acquires information on a control target device to be operated by use of a web page (step S311), embeds the information in a web page acquisition request message, and transmits the message (step S312). As described above, this step can be realized by various methods such as an HTTP request header, a payload, and a query character string. Note that the information to be embedded may either be the protocol information alone, or other information necessary for remote access via the network 105, such as device-type information, home IP address/port number information, and a mail address. Here, the former method requires embedding, in a control program, processing for: detecting and identifying a device to be actually controlled according to a control protocol; and transmitting a control command. Meanwhile, the detection processing can be omitted in the latter method. As shown in FIG. 19, the control protocol information alone is included in this example.

The second difference in the operation sequence is in the content URI processing in step S313. The processing flowchart of the third example is similar to the flowchart of the second example (FIG. 14), except for the following points. Specifically, the differences are: that the aforementioned control target device information is extracted in device information extraction processing in step S2002; and that information is obtained by using acquired device-type information and protocol information as a key in device control program acquisition processing in step S2008.

The third difference is in processing after the information viewer 302 acquires a web page and user B clicks a button on the web page. In step S2008 of FIG. 14, when entry 1 of FIG. 19 is selected, a program for detecting and controlling a device based on the DLNA protocol is embedded in the web page. With a click of a "reproduce recorded content" button by user B, the information viewer 302 executes a device detection step (DLNA Search) based on the DLNA protocol, and detects the content reception device 103 as a device including a CDS (Content Directory Service) for managing recorded contents (steps S317 and S318). Subsequently, the information viewer 302 executes a content search and reproduction step (DLNA Action) for the detected content reception device 103 by using, as a key, four values including a network ID, a service ID, a transport stream ID, and a start time (step S319). If the target content is already recorded, the content reception device 103 performs the required reproduction processing (step S320), and returns a message indicating that the processing is performed correctly (step S321). If the content is not recorded, the content reception device 103 returns a search error message.

As has been described, according to the third example, it is possible to operate a device other than the device which requests for content URI processing. To be specific, in a situation where a user views an SNS on a laptop PC, the user can actually operate a nearby digital television according to the content URI.

Fourth Example

Figure 21:
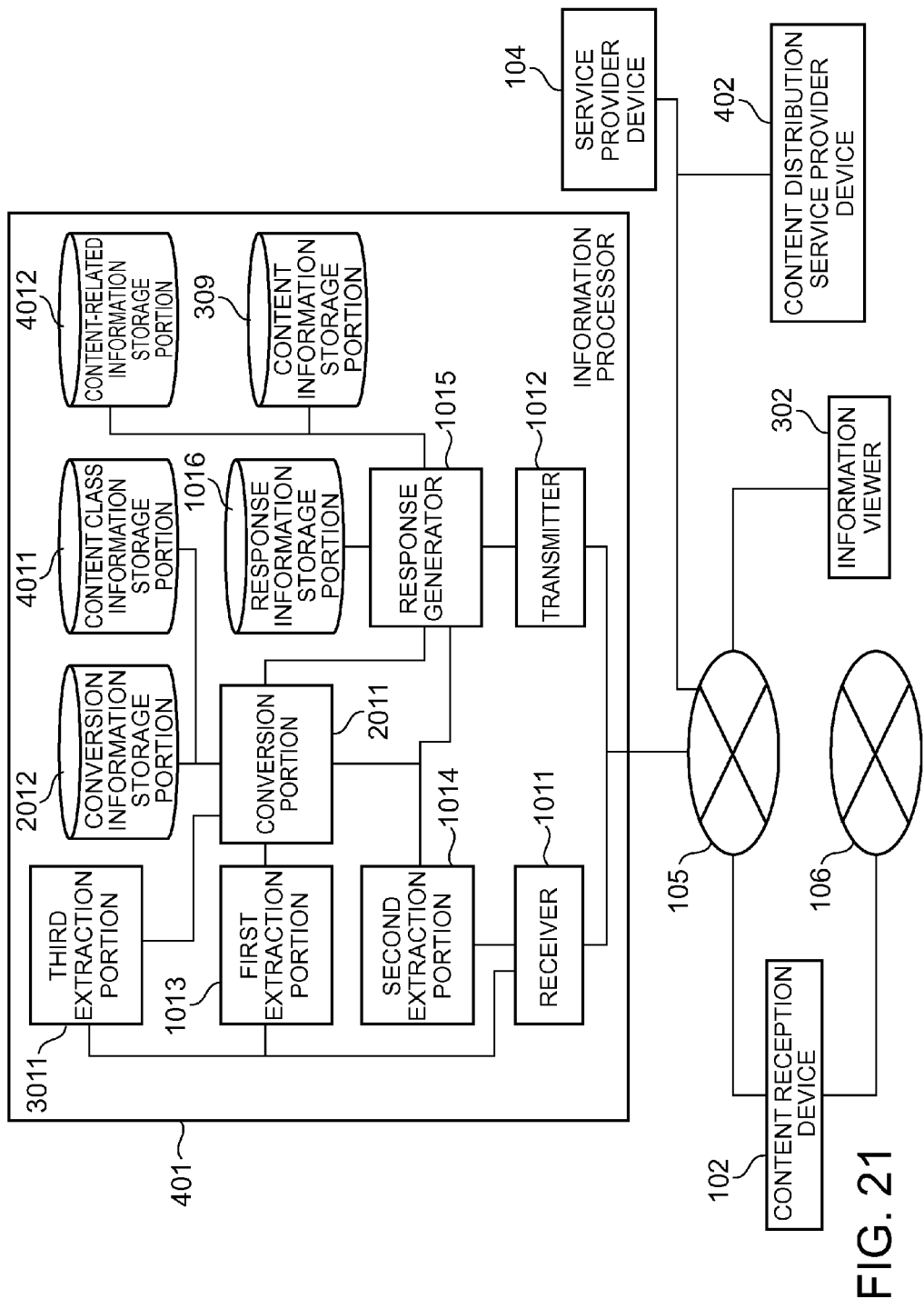
FIG. 21 is a block diagram showing a system including an information processor 401 according to a fourth example.

FIG. 21 is a block diagram showing a system including an information processor 401 according to a fourth example.

A concrete case assumed in the fourth example will be described.

As in the first, second, and third examples, the main part of the case of the fourth example is that user B reads a message from user A in which a content URI is cited, and clicks the content URI to thereby view, perform programmed-recording, or perform a similar operation for the content associated with the URI. There are three points in the fourth example different from the first, second, and third examples. The first point is that the system including the information processor 401 of the fourth example does not include a content reception device 103, and user B only has an information viewer 302. The second point is that what is associated with a content URI is not a broadcast content but is an Internet content. The third point is that the information processor 401 transmits a web page with related information assigned thereto. More specifically, use B views an SNS on a laptop PC, but does not own a television (first difference). Then, when user B clicks a content URI presented by user A, he/she not owning a television cannot view the content on broadcast, even though the content is a broadcast content. The information processor 401 returns a page including a "view program on the Internet" button (a link to a URI of the content shown in a VoD (Video On Demand) service on the Internet) (second difference). At this time, the information processor 401 returns the page with contents and product information related to the content also embedded therein (third difference).

Hereinafter, details of this example will be described with reference to FIG. 21.

Points in the system configuration of the fourth example different from the third example are that the network 303 and the content reception device 103 are eliminated therefrom, and that a content distribution service provider device 402 in the network 105 is added thereto.

The hardware configuration of the content distribution service provider device 402 is similar to that of the service provider device 104. Conceivable services to be provided by the content distribution service provider device 402 include: a VoD service in which a broadcaster charges for distribution of already-broadcasted programs, and a general video sharing service. In this example, the service is assumed to be a charged VoD service provided by a broadcaster.

Next, points in the information processor 401 different from the third example will be described. The hardware configuration of the information processor 401 is similar to that of the third example, except that a content class information storage portion 4011 and a content-related information storage portion 4012 are added thereto. In addition, there is also a difference in functions of a conversion portion 2011.

The content class information storage portion 4011 stores therein content information dependent on a distributed medium and content information independent of the distribution medium (referred to below as content class information), in association with each other. Concretely, film A, which is broadcasted as a broadcast program at a certain date and time by a certain broadcaster, is associated with film A as a package. FIG. 22 shows an example of a data structure of the content class information storage portion 4011. As shown in FIG. 22, associated with each other are: information on the type of distribution media (medium type); pieces of information used to uniquely identify the content in the distribution media (terrestrial digital broadcasting service and an Internet VoD service) (medium-dependent content ID); and a content class identifier serving as a package of the content. Although omitted in FIG. 22, attribute information on the content class ID (content information independent of the distribution medium, such as a content package name, a date of production, and a producer) may be managed in a different table. FIG. 22 is only an example, and may contain other information as long as it is information which associates the content across a plurality of distribution media. In addition, a content identifier (content URI) in a certain distribution medium may be used as a substitute for the content class identifier Note that the information shown in FIG. 22 corresponds to second conversion information, and the information indicating media supported by the information viewer 302 corresponds to second information on the first device.

The content-related information storage portion 4012 is configured to store therein content information associated with content URIs, or information on contents and products related to content class information. A content class identifier and related information may be stored in association with each other, or medium-dependent content identifier (content URI) and related information may be stored in association with each other.

Next, operations of the information processor 401 will be described. Hereinafter, points in the operation of the information processor 401 different from the third embodiment will be described. The points are in processing of the conversion portion 2011 and a response generator 1015.

Firstly, the conversion portion 2011 learns from information extracted by a second extraction portion 1014, that the target device is the information viewer 302 (a device such as a lap top PC or a tablet PC which does not have a terrestrial digital broadcast reception tuner). Further, the conversion portion 2011 may learn from information extracted by a third extraction portion 3011 that there is no operation target device (i.e., the content reception device 103). The conversion portion 2011 determines from the given information that the information viewer 302 does not have a function for viewing a broadcast service. Hence, the conversion portion 2011 acquires, from the content class information storage portion 4011, a content URI of an Internet VoD service corresponding to a medium dependent content (content identified by a network ID, a service ID, a transport stream ID, and a start time, as mentioned in aforementioned examples) indicated by a content URI. As shown in FIG. 22, this content URI can be acquired by retrieving, from the content class information storage portion 4011, information including the same content class identifier and whose distribution medium type is an Internet VoD service. Since content 1 and content 3 have the same content class identifier in FIG. 22, it can be seen that a URI of a terrestrial digital broadcast program (http://tv.nameservice.com/n_101/s_201/t_301/20101201190000) in an Internet VoD service is http://vod.example.com/101/201/301/20101201190000.

Figure 23:
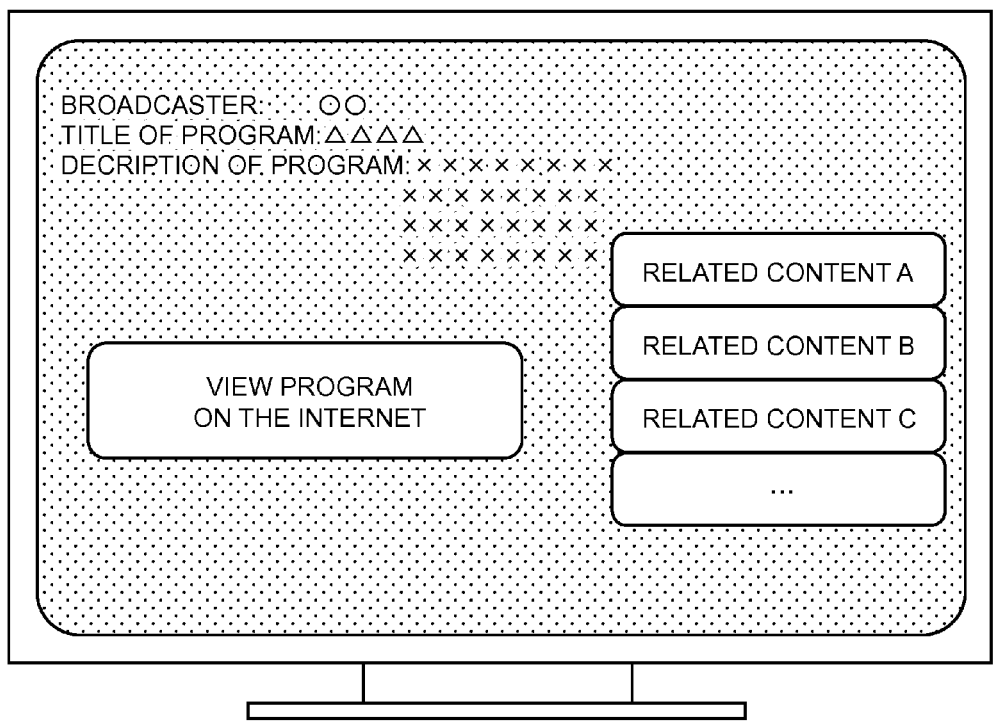
FIG. 23 is a diagram showing an example of a web page displayed on an information viewer 302 of FIG. 22.

Then, the response generator 1015 embeds the content URI in the Internet VoD service, which is acquired by the conversion portion 2011, as a link in a web page. The method for embedding the content URI in a web page template has been shown in the first to third examples. At this time, related contents and products (in the case of serial contents, a VoD content of another series, a DVD package, and the like) may be retrieved from the content-related information storage portion 4012 by using the content URI in the Internet VoD service or the content class identifier as a key, and be embedded. A concrete example of the web page to be generated is shown in FIG. 23. By clicking the displayed link, user B (information viewer 302) having received the web page can access the content shown in the Internet VoD service (content distribution service provider device 402) in one step.

As has been described, according to the fourth example, content URIs are managed across distribution media. Hence, even though a user cannot view a content broadcasted through a certain distribution medium, a link to the content in another distribution medium can be returned to the user. Further, by embedding content-related information in a web page, it is possible to advertise and make opportunities for selling related products with this configuration.

An effect of at least one of the examples described above is that: in a case where a plurality of users use a service in which a URI identifying a television program and an Internet service are linked, and where a first user uses a URI generated by a second user, the first user can receive the service using URI irrespective of the user environment.

The present invention is not limited to the embodiments stated so far but can be carried out by modifying the constituent elements without departure from the scope of the present invention in a working phase. Moreover, various inventions can be created by appropriate combinations of a plurality of constituent elements disclosed in the embodiments stated so far. For example, some of the constituent elements can be deleted from the overall constituent elements shown in the embodiments. Besides, the constituent elements in the different embodiments can be appropriately combined.

The process program(s) according to this embodiment may be provided after being recorded on a computer readable recording medium, such as a CD-ROM (Compact Disk Read Only Memory), flexible disk (FD), CD-R (Compact Disk Recordable), DVD (Digital Versatile Disk), in the form of an installable format file or executable format file.

The process program(s) according to this embodiment may be stored on a computer connected to a network, such as the Internet, and may be downloaded through the network so as to be provided. The process program(s) according to this embodiment may be provided or delivered through a network, such as the Internet.

The process program(s) of this embodiment may be incorporated in the ROM or the like so as to be provided.

What is claimed is:

1. An information processor comprising:
   a receiver that receives, from a first device, a response information request including content identification information for identifying a content in a network and device identification information for identifying a type of an execution device that actually performs processing on the content;
   an extraction portion, executed by a processor using a program, that extracts a plurality of element information pieces included in the content identification information;
   a storage that stores therein conditions for a first element information piece among the plurality of element information pieces, and a response information piece in association with each condition; and
   a generator, executed by the processor, that generates a response message including the response information piece stored in association with a condition that the first element information piece extracted by the extraction portion satisfies among the conditions for the first element information piece stored in the storage,
   wherein the response message includes a control command program which serves as user interface information, and which enables processing to be performed on the content, and a device detection program for detecting the execution device,
   wherein the control command program controls internal functions of the execution device to view or record the content, and
   the control command program varies depending on the type of the execution device that actually performs the processing on the content.

2. The information processor according to claim 1, wherein the first element information piece is time information related to the content.

3. The information processor according to claim 1, further comprising:
   a second storage to store therein first conversion information for converting the element information pieces; and
   a conversion portion, executed by the processor, that converts the element information pieces by use of first information related to the first device and the first conversion information.

4. The information processor according to claim 3, wherein the first information related to the first device is information included in the response information request.

5. The information processor according to claim 3, further comprising:
   a third storage to store therein second conversion information for converting the content identification information; wherein
   the conversion portion converts the content identification information by use of second information related to the first device and the second conversion information.

6. The information processor according to claim 5, wherein the second information related to the first device is information included in the response information request.

7. The information processor according to claim 3, wherein:
   the first conversion information is information in which the element information pieces included in the content identification information are associated with a combination of a broadcast area and a broadcaster, and the first information related to the first device is a broadcast area to which the first device belongs; and
   in a case where a broadcast area stored in association with the element information pieces extracted by the extraction portion is different from the broadcast area to which the first device belongs,
   the conversion portion converts the element information pieces extracted by the extraction portion into element information pieces associated with a combination of the broadcast area to which the first device belongs and the broadcaster associated with the element information pieces extracted by the extraction portion.

8. The information processor according to claim 5, wherein:
   the second conversion information is information in which the content identification information is associated with information on a medium providing the content, and the second information related to the first device is information indicating a medium supported by the first device;

in a case where a medium providing a content identified by the content identification information included in the response information request is different from the medium supported by the first device, the conversion portion converts the content identification information included in the response information request into content identification information stored in association with the medium supported by the first device; and the generator generates a response message including the response information piece corresponding to the condition satisfied by the element information pieces converted by the conversion portion.

9. The information processor according to claim 1, further comprising a second extraction portion executed by the processor, wherein:

the response information request further includes device information related to the first device;

the second extraction portion extracts the device information from the response information request;

the storage stores the response information piece in association with a combination of each of the conditions for the element information pieces and a condition for the device information; and the generator generates a response message including a response information piece associated with the condition satisfied by the device information extracted by the second extraction portion.

10. The information processor according to claim 9, wherein the response message includes information to be displayed on the first device.

11. The information processor according to claim 1, further comprising a content information storage to store therein content element information being information on the content; and the generator includes the content element information in the response message.

12. The information processor according to claim 11, further comprising a transmitter that transmits the response message generated by the generator to the first device.

13. The information processor according to claim 12, wherein the generator includes control protocol information for controlling the execution device in the response message.

14. An information processing method comprising:

receiving, from a first device, a response information request including content identification information for identifying a content in a network and device identification information for identifying a type of an execution device that actually performs processing on the content;

extracting a plurality of element information pieces included in the content identification information; and generating a response message by referring to a storage that stores conditions for a first element information piece among the plurality of element information pieces and a response information piece in association with each condition, the response message including the response information piece stored in association with a condition that the first element information piece satisfies, among the conditions for the first element information piece stored in the storage, wherein the response message includes a control command program which serves as user interface information, and which enables processing to be performed on the content, and a device detection program for detecting the execution device, wherein the control command program controls internal functions of the execution device to view or record the content, and the control command program varies depending on the type of the execution device that actually performs the processing on the content.

15. The information processing method according to claim 14, wherein the first element information piece is time information related to the content.

16. A non-transitory computer readable storage medium storing an information processing program for causing a computer to generate a message, comprising the functions of:

receiving, from a first device, a response information request including content identification information for identifying a content in a network and device identification information for identifying a type of an execution device that actually performs processing on the content;

extracting a plurality of element information pieces included in the content identification information; and generating a response message by referring to a storage that stores conditions for a first element information piece among the plurality of element information pieces and a response information piece in association with each condition, the response message including the response information piece stored in association with the condition that the first element information piece extracted by the extraction function satisfies, among the conditions for the first element information piece stored in the storage, wherein the response message includes a control command program which serves as user interface information, and which enables processing to be performed on the content, and a device detection program for detecting the execution device, wherein the control command program controls internal functions of the first device to view or record the content, and the control command program varies depending on the type of the execution device that actually performs the processing on the content.

17. The non-transitory computer readable storage medium storing the information processing program, according to claim 16, wherein the first element information piece is time information related to the content.

* * * * *